(12) United States Patent
Cyr et al.

(10) Patent No.: US 6,434,029 B1
(45) Date of Patent: Aug. 13, 2002

(54) BOOST TOPOLOGY HAVING AN AUXILIARY WINDING ON THE SNUBBER INDUCTOR

(75) Inventors: Jean-Marc Cyr, Candiac; Richard Verreau, Montreal, both of (CA)

(73) Assignee: Astec International Limited (HK)

( * ) Notice: Subject to any disclaimer, the term of this patent is extended or adjusted under 35 U.S.C. 154(b) by 0 days.

(21) Appl. No.: 09/981,553

(22) Filed: Oct. 17, 2001

(51) Int. Cl.$^7$ .................................................. H02M 7/68
(52) U.S. Cl. .......................... 363/86; 323/222; 361/91.7
(58) Field of Search ............................... 323/222, 254, 323/263, 282, 271; 363/86, 44, 45, 46; 361/18, 91.7

(56) References Cited

U.S. PATENT DOCUMENTS

| | | | |
|---|---|---|---|
| 5,293,111 A | 3/1994 | Weinberg | 323/222 |
| 5,414,613 A | 5/1995 | Chen | 363/52 |
| 5,477,131 A * | 12/1995 | Gegner | 323/222 |
| 5,486,752 A | 1/1996 | Hua et al. | 323/222 |
| 5,543,704 A | 8/1996 | Thoren | 323/222 |
| 5,736,841 A | 4/1998 | Gucyski | 323/222 |
| 5,736,842 A | 4/1998 | Jovanovic | 323/222 |
| 5,793,190 A | 8/1998 | Sahlstrom et al. | 323/222 |
| 5,815,386 A | 9/1998 | Gordon | 363/50 |
| 5,841,268 A | 11/1998 | Mednik | 322/222 |
| 5,914,587 A | 6/1999 | Liu | 323/222 |
| 5,923,153 A | 7/1999 | Liu | 323/222 |
| 5,959,438 A | 9/1999 | Jovanovic | 323/222 |
| 5,977,754 A | 11/1999 | Cross | 323/222 |
| 5,991,174 A | 11/1999 | Farrington | 363/56 |
| 6,008,630 A | 12/1999 | Prasad | 323/222 |
| 6,028,418 A | 2/2000 | Jovanovic et al. | 323/222 |
| 6,051,961 A | 4/2000 | Jang et al. | 323/224 |
| 6,060,867 A | 5/2000 | Farrington et al. | 323/222 |
| 6,236,191 B1 | 5/2001 | Chaffai | 323/222 |
| 6,323,627 B1 * | 11/2001 | Schmiederer et al. | 323/222 |

OTHER PUBLICATIONS

"A Family of PWM Soft–Switching Converters Without Switch Voltage and Current Stresses," Vilela, Coelho, Vieira, de Freitas, Farias; IEEE 0–7803–3–73–0/96 pp. 533–536 (1996), no month.

* cited by examiner

Primary Examiner—Shawn Riley
(74) Attorney, Agent, or Firm—Coudert Brothers LLP (57) ABSTRACT

A boost converter topology is disclosed that includes a resonant network comprising a snubber inductive element having a primary winding connected in series to a first resonant diode that is connected, at a first node, to two series connected additional resonant diodes and a secondary winding coupled to a fourth resonant diode connected to the first node. The present invention has the advantage of reducing the energy stored in the parasitic capacitor of the first resonant diode by a factor of four at the turn off of the main control switch. This reduction is achieved by allowing only a small amount of energy transfer to the snubber inductive element so that it does not turn the two additional resonant diodes on before the auxiliary switch is turned on, thus reducing losses and EMI associated with turning on the auxiliary switch.

16 Claims, 6 Drawing Sheets

BOOST TOPOLOGY HAVING AN AUXILIARY WINDING ON THE SNUBBER INDUCTOR

FIELD OF THE INVENTION

The present invention generally relates to DC—DC converters and particularly, to an improved circuit topology for boost converters.

BACKGROUND OF THE INVENTION

Figure 1:
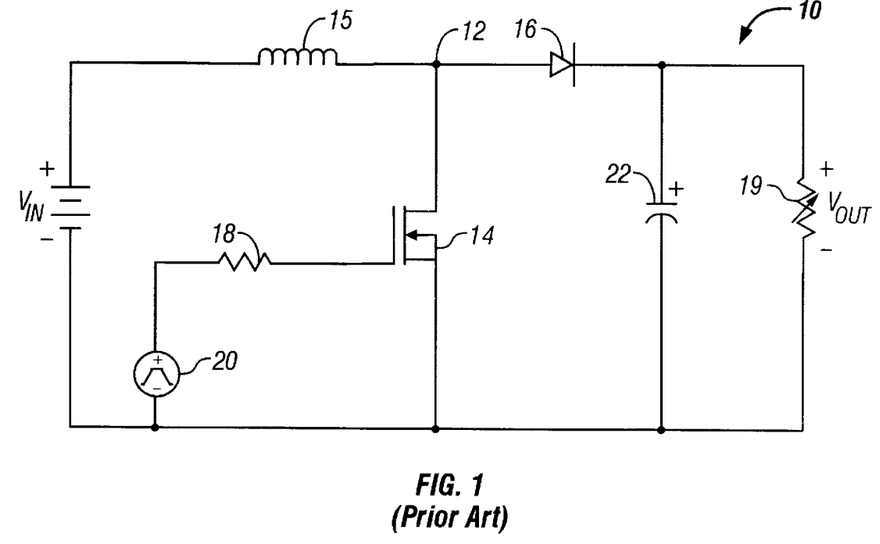
FIG. 1 is a schematic diagram of a power converter having a conventional boost topology.

A boost converter is a type of flyback converter where a smaller input DC voltage is increased to a desired level. A prior art typical boost converter 10 is shown in FIG. 1. As shown in FIG. 1, the typical boost converter includes an inductor 15, to which the input voltage Vin is coupled, that is in series with a boost diode 16 connected to an output capacitor 22 across which the load 19 is connected. A transistor switch 14 is connected to a node 12 between the inductor 15 and boost diode 16 and ground to provide regulation of the output voltage. The control circuit 20 for the transistor switch 14 typically includes a comparator (not shown) for sensing and comparing the output voltage of the converter to a voltage reference to generate an error voltage. This error voltage is then coupled to a duty cycle constant frequency pulse width modulator circuit (PWM). The PWM converts the error voltage into a control signal. A gate resistor 18 couples this control signal to the transistor switch 14 control input for controlling the timing of the on and off transition of the transistor switch 14. When the transistor switch 14 is on, the inductor current increases, storing energy in its magnetic field. When the transistor switch 14 is off, energy is transferred via the diode 16 to the output energy storage capacitor 22 and the load 19. The transistor switch 14 is operated at a high frequency relative to the resonance of the inductor capacitor network.

Drawbacks of such conventional boost converter circuits include the creation of switch voltage and current stresses resulting in low efficiency power conversion. Another drawback of switched power circuits is the electromagnetic interference (EMI) arising from the large change in current (di/dt) and voltage (dV/dt) that occurs when the switch changes state. More specifically, one drawback of the conventional boost converter circuit in FIG. 1 is the recovery current of the boost diode 16 added to the power loss due to the discharge of the switch output capacitance, Coss, of the switch 14 (1/2 Coss $V^2 f$) at turn on. Increased EMI noise is also generated due to the snap off of the boost diode 16 after it stops conducting. Another drawback of the boost converter 10 is the losses at turn off of transistor switch 14. The Coss of the transistor switch 14 is so low that the turn off loss is significant. Increasing this capacitor does not overcome this because the losses would only be transferred at turn on. To overcome these drawback, boost converters have been proposed that provide soft switching, i.e., switching at low voltage and current stress across the transistor switch. A prior art boost topology 30 to overcome the drawback at turn on of the main switch 14 is shown in FIG. 2.

Figure 2:
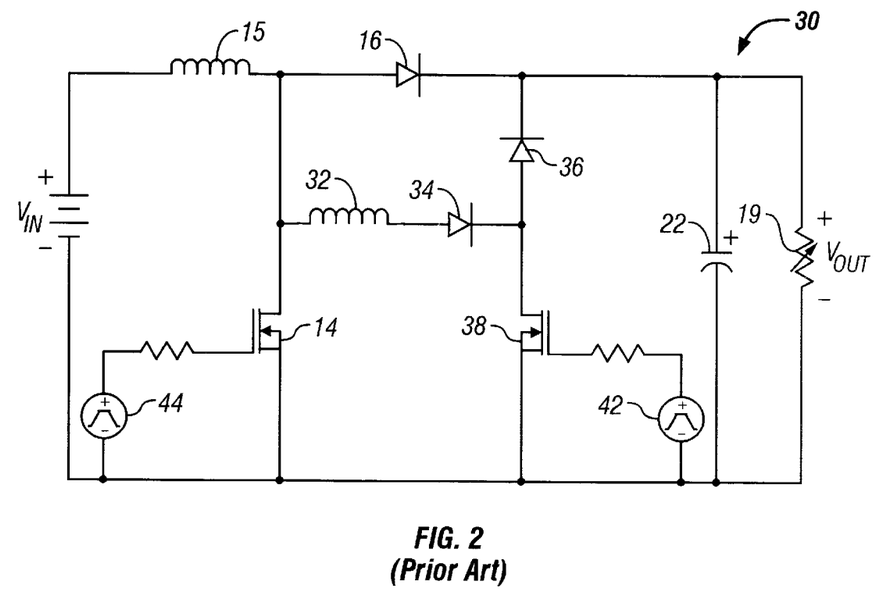
FIG. 2 is a schematic diagram of a power converter having a conventional boost topology including a snubber inductor.

As shown in FIG. 2, an input voltage $V_{IN}$ is converted into output power ($V_{OUT}$) using a resonant network in addition to the conventional components of a boost converter. The resonant network comprises a snubber inductor 32, coupled in series with resonant diode 34 and a 36. Auxiliary switch 38 and resonant diode 36 are in series and are connected in parallel with main switch 14. The snubber inductor 32, with a value significantly smaller than the boost inductor 15, in conjunction with the auxiliary switch 38 is added to control the recovery current of the boost diode 16 at its turn off. This topology allows a zero voltage switching (ZVS) on the main switch 14 and a zero current switching (ZCS) on the auxiliary switch 38. In operation, a ZVS detection circuit (included in control circuit 44, details not shown) monitors the voltage across the main switch 14 to turn it on at zero volts. Snubber inductor 32 limits the current at turn on of the auxiliary switch 38 to achieve the ZCS.

A drawback exhibited by the boost topology of FIG. 2 is that the energy in the parasitic capacitor of resonant diode 34 is transferred to the snubber inductor 32 at the turn off of the main switch 14. This transfer results in a current in resonant diode 34 that turns resonant diode 36 on. When the auxiliary switch 38 is turned on, the recovery current of resonant diode 36 will generate a current spike that causes losses in the auxiliary switch 38 and increased EMI noise. The power lost through the auxiliary switch 38 reduces the efficiency of the boost converter. A boost topology 40 to overcome the drawback associated with turn off of the main switch 14 and auxiliary switch 38 is shown in FIG. 3.

Figure 3:
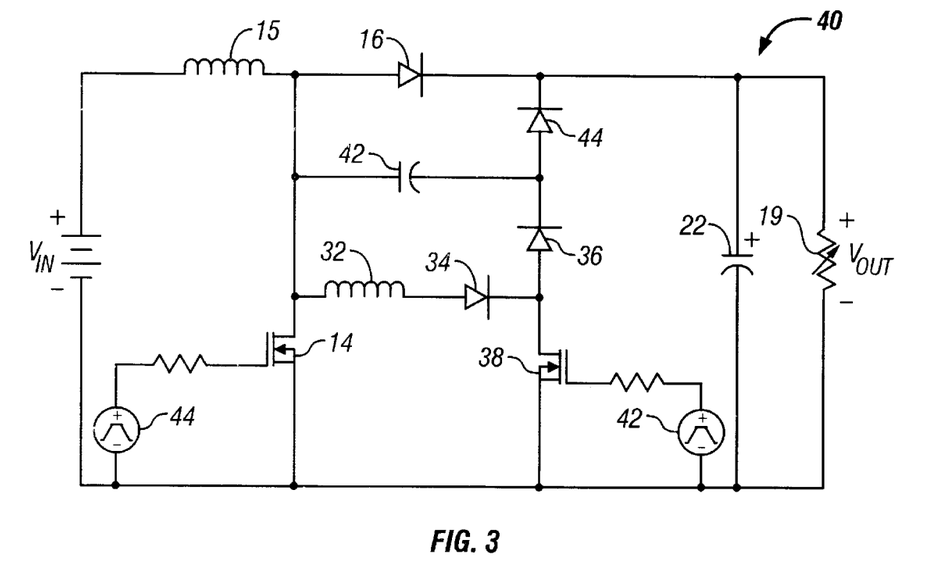
FIG. 3 is a schematic diagram of a power converter having a boost topology including a snubber capacitor.

The boost topology 40 in FIG. 3 adds a snubber capacitor 42 and resonant diode 44 to the topology shown in FIG. 2. In operation, at turn off of the main switch 14, the snubber capacitor 42 is already charged to the output voltage. As a result, the current circulates into snubber capacitor 42 and the resonant diode 44 to smooth the dv/dt across the main switch 14. The snubber capacitor 42 will discharge to zero in order to turn the boost diode 16 on. At turn off of the auxiliary switch 38, the series combination of the discharged snubber capacitor, resonant diode 36 and main switch 14 are in parallel with the auxiliary switch 38 and smooth the dv/dt. The snubber capacitor 42 will again be charged to the output voltage. For this operation, energy is only exchanged between the Coss of each switch via the snubber capacitor 42, thus there is no additional energy dissipation. The topology of FIG. 3 addresses the dv/dt at turn off the switches, however, a drawback exhibited by this topology is associated with losses due to the recovery current of resonant diodes 36 and 44 at turn ON of the auxiliary switch. A boost topology 50 to overcome this drawback is shown in FIG. 4.

Figure 4:
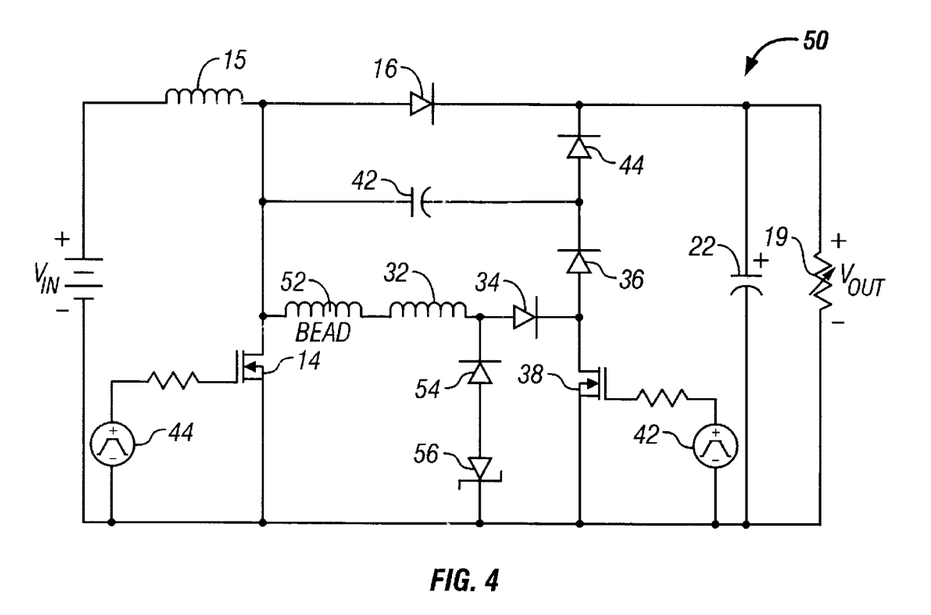
FIG. 4 is a schematic diagram of a power converter having a boost topology including a bead and a clamping circuit.

As shown in FIG. 4, a boost topology 50 adds an inductor bead 52 and a clamping circuit formed by diodes 54 and 56 to the topology of FIG. 3. A commonly assigned U.S. Pat. No. 6,236,191 ZERO VOLTAGE SWITCHING BOOST TOPOLOGY which is incorporated by reference herein. U.S. Pat. No. 6,236,191 discloses a topology similar to boost topology 50 without the clamping circuit. This topology adds the inductor bead 52 in conjunction with the slower resonant diodes 36 and 44, to overcome the drawback of recovery current of those diodes at turn on of the auxiliary switch 38. For this topology, resonant diode 34 is a fast recovery type diode, such that it stops conducting (and recovers) before the remaining resonant diodes. The remaining charges in the slower resonant diodes 36 and 44 begin to charge the parasitic capacitor of resonant diode 34. In operation, resonant diodes 36 and 44 must be slow enough to ensure that resonant diode 34 recovers first, but fast enough to be recovered before the parasitic capacitor of resonance diode 34 is charged. If resonant diodes 36 and 44 are not recovered when the parasitic capacitor of resonant diode 34 is fully charged, a current spike will occur upon turn ON of the auxiliary switch 38. This charge up of the parasitic capacitor of resonant diode 34 is completed by the parasitic capacitor, Coss, of the auxiliary switch 38. However, because resonant diodes 36 and 44 are slower than resonant diode 34, the parasitic capacitor, Coss, of the auxiliary switch 38 will not discharge as much as if the diodes were the same. This reduces the resonance between the snubber inductor 32 and Coss of the auxiliary switch which reduces the current in resonant diodes 36 and 44.

As the first resonant diode 34 is a fast recovery type diode, it recovers the stored charge that is dissipated by the snubber inductor 32 and stops conducting the corresponding current before the second and third resonant diodes 36,44 recover their stored charges. In this fashion, the current flowing through the first resonant diode 34 and into auxiliary switch 38 when it turns ON during its next cycle is substantially eliminated. As a result, power losses associated with the auxiliary switch 38 turning ON are substantially eliminated, as well as EMI noise reduced.

In the topology in FIG. 4, a clamping circuit is formed by the series combination of clamping diode 54 and zener diode 56. This combination is coupled between the junction of snubber inductor 32 and first resonant diode 34 and ground. In operation, clamping diode 54 and zener diode 56 clamp the voltage to prevent first resonant diode 34 from reaching its breakdown voltage in a high ambient environment due to the increase of recovery current and the saturation of the bead 52.

A drawback exhibited by the topology of FIG. 4 is that its effectiveness is affected under high ambient temperature due to the large variations (deltas) in the BH curves from one bead manufacturer to another. Because of this variation, in some cases, the second and third resonant diodes 36,44 are still conducting when the auxiliary switch 38 is turned ON, resulting in a current spike, increased power loss and EMI. An additional drawback of the topology of FIG. 4 is the speed requirements for the resonant diodes. Second and third resonant diodes 36,44 must be slower compared to first resonant diode 34, but not too much slower. They must be fast enough to be recovered before the parasitic capacitor of resonance diode 34 is charged. Another drawback of the topology of FIG. 4 is that the second and third resonant diodes 36,44 must have the same temperature behavior characteristics in terms of rapidity in order to stay in the same ratio as compared to the first resonant diode 34.

SUMMARY OF THE INVENTION

The aforementioned and related drawbacks associated with prior art boost converters are substantially reduced or eliminated by the improved boost converter topology of the present invention.

The present invention improves upon the topology in FIG. 4 by adding a secondary winding to the boost inductor. This winding is connected in series with a resonant diode that connects to the drain of the auxiliary switch. A capacitor has also been added in parallel with a resonant diode connected in series with the secondary winding. The present invention has the advantage of reducing the energy stored in the parasitic capacitor of the first resonant diode by a factor of 4 at the turn off of the main control switch. This reduction is achieved by allowing only a small amount of energy transfer to the boost snubber inductor so that it does not turn the second and third resonant diodes on before the auxiliary switch is turned on, thus reducing losses and EMI.

For the present invention, at turn off of the main control switch, the voltage is shared between the two parasitic capacitors of a resonant diodes connected to the primary and secondary windings of the boost snubber inductor. During this time, no energy is stored in the boost snubber inductor due to the transformer effect. The capacitor added in parallel with the resonant diode connected to the secondary winding will discharge even more of the parasitic capacitor of the diode connected to the primary winding.

In a preferred embodiment of the present invention, the boost converter comprises a power converter having two input terminals for connection to a power source, comprising an inductor connected to a first one of the input terminals; a boost diode connected in series communication with the inductor, the boost diode having a cathode connected to a first output terminal; an output capacitor coupled across the first output terminal and a second output terminal; a control switch, connected between a first node at the junction of the series connected inductor and boost diode and a second of the input terminals, for controlling the application of voltage to the output terminals as a function of the duty cycle of the control switch, the second of the input terminals and the second output terminal being connected in common; a resonant network, coupled between the first node and the first output terminal, the resonant network including a snubber inductive element, a first resonant diode, a second resonant diode, a third resonant diode, and a fourth resonant diode, the snubber inductive element having a primary winding and secondary winding, the primary winding and the first resonant diode connected in series between the first node and a second node; the cathode of the first resonant diode coupled to the second node and the anode of the first resonant diode coupled to the primary winding; the second and third resonant diodes connected in series between the second node and the first output terminal, the anode of the second resonant diode coupled to the second node and the cathode of the second resonant diode coupled to the anode of the third resonant diode, the secondary winding and the fourth resonant diode connected in series between the second input terminal and the second node; the anode of the fourth resonant diode coupled to the secondary winding and the cathode of the fourth resonant diode coupled to the second node; a first resonant capacitor coupled between the first node and the junction of the second and third resonant diodes; and an auxiliary switch, connected between the second node and the second output terminal, the auxiliary switch being turned on such that the voltage at the control switch is caused to reduce to zero when the control switch turns on.

The improved topology of the present invention thus allows for the control switches to be turned on without exhibiting the level of power losses experienced by prior art boost converters.

An advantage of the present invention is that it provides the ability to turn on the control switches of a power converter without producing significant power losses.

Another advantage of the present invention is that it provides for zero voltage switching of the control switches of a power converter.

Yet another advantage of the present invention is that it reduces the amount of stress exhibited with respect to the components of a power converter and the resultant EMI noise.

Another advantage of the present invention is the effectiveness of the topology is not affected under high ambient temperatures due to the variation in BH curves of saturable beads among manufacturers.

Another advantage is that the topology of the present invention allows the use of the same diode type. Thus the present invention does not depend upon the precise selection of resonant diode speed characteristics, and is not dependent upon those speed characteristics being consistent over the operating temperature ranges.

BRIEF DESCRIPTION OF THE DRAWINGS

The aforementioned and related advantages and features of the present invention will become apparent upon review of the following detailed description of the invention, taken in conjunction with the following drawings, where like numerals represent like elements, in which.

DETAILED DESCRIPTION OF THE INVENTION

Figure 5:
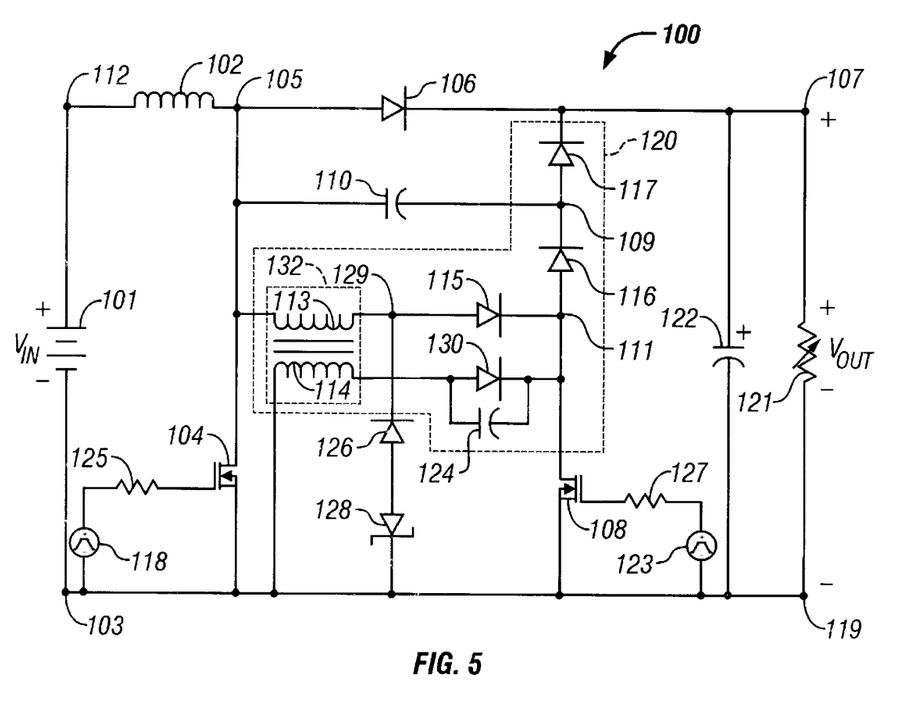
FIG. 5 is a schematic diagram of a power converter having a boost topology according to the present invention.

The power converter of the present invention will now be described with respect to FIGS. 5 to 9. FIG. 5 is a schematic diagram of the power converter of the present invention. In a preferred embodiment of the present invention, the converter 100 has a boost topology including a voltage source $V_{IN}$, shown at 101 whose positive terminal 112 is connected to one terminal of an inductor 102. The other terminal of inductor 102 is connected to the anode of a boost diode 106, at node 105. The cathode of boost diode 106 is connected to an output terminal 107 of converter 100.

A control switch 104 is connected in parallel with voltage source 101 and inductor 102, i.e., between node 105 and a negative terminal 103 of voltage source 101. Control switch 104 controls the application of the voltage $V_{IN}$ to a load 121 via the boost diode 106 and an output capacitor 122. The output capacitor 122 is connected across the output terminals 107 and 119 of the converter 100. In a preferred embodiment of the present invention, control switch 104 is an n-channel MOSFET having a source, drain and gate. The switching of the control switch 104 is controlled by application of a suitable waveform to its control gate. The waveform is provided to the gate of the control switch 104 by a first signal generator 118. In a preferred embodiment, the first signal generator 118 is a PWM signal generator. The drain of the control switch 104 is coupled to node 105. The source of the control switch 104 is coupled to negative terminal 103.

A resonant network 120 is coupled between node 105 and output terminal 107 as shown in FIG. 5. The resonant network 120 is operative to prevent power losses associated with auxiliary switch 108 by maintaining the voltage level across auxiliary switch 108 at a specified level before auxiliary switch 108 is turned on. In this fashion, auxiliary switch 108 can be turned on with no recovery current or without blocking any diode. Consequently, no power loss results when auxiliary switch 108 is turned on. The resonant network includes a boost snubber inductive element 132, a plurality of resonant diodes 115, 116, 117, and 130, and a capacitor 124. Inductive element 132 is comprised of a primary winding 113 and a secondary winding 114 wound over two cores. Inductive element 132 is preferably constructed of a toroid inductor core and a ferrite bead core that are wound together to form the two windings. The primary winding 113, a first resonant diode 115, a second resonant diode 116, and a third resonant diode 117 are connected in series. The secondary winding 114, a fourth resonant diode 130, the second resonant diode 116, and the third resonant diode 117 are connected in series. The cathode of the fourth resonant diode 130 is coupled to node 111. The cathode of the third resonant diode 117 is coupled to output terminal 107. A snubber resonant capacitor 110 is connected between node 105 and a node 109. Node 109 is located at the junction between the second resonant diode 116 and the third resonant diode 117.

An auxiliary control switch 108 is coupled between a node 111 and the negative terminal 103 of voltage source 101. In a preferred embodiment of the present invention, the auxiliary control switch 108 is an n-channel MOSFET having a source, drain and gate. In operation, auxiliary switch 108 acts with capacitors 110,124, inductive element 132, and diodes 115, 116, 117 and 130 to provide a snubber circuit for the boost topology of boost inductor 102, boost diode 106 and control switch 104.

More specifically, a first terminal of primary winding 113 of inductive element 132 is connected to the drain terminal of control switch 104, at node 105. The second terminal of the primary winding 113, identified in FIG. 5 by the dot showing the polarity, is coupled to the anode of the first resonant diode 115, at a node 129. A first terminal of secondary winding 114 of inductive element 132 is connected to negative terminal 103. The second terminal of secondary winding 114, identified in FIG. 5 by the dot showing the polarity, is connected to the anode of the fourth resonant diode 130. The cathode of the fourth resonant diode 130 is coupled to the cathode of the first resonant diode 115, at node 111. The cathode of the first resonant diode 115 is connected to the anode of the second resonant diode 116. The cathode of the second resonant diode 116 is connected to the anode of the third resonant diode 117 at node 109. The cathode of the third resonant diode 117 is connected to output terminal 107. The drain of auxiliary switch 108 is connected to the cathode of the first resonant diode 115 and the cathode of the fourth resonant diode 130, at node 111. The capacitor 124 is connected in parallel across the fourth resonant diode 130.

A first clamping diode 126 and a second clamping diode 128 are connected in series between the anode of the first resonant diode 115, at node 129, and negative terminal 103. The second clamping diode 128 is preferably a zener diode. In operation, diodes 126 and 128 form a clamping circuit which limits the overshoot across the fourth resonant diode 130.

In a preferred embodiment of the present invention, the toroid inductor and ferrite bead of inductive element 132 are wound together such that there are 5% more turns at the secondary winding 114 than at the primary winding 113. Preferably, the resonant capacitor 110 has a value of 2040 pF, the capacitor 124 has a value of 47 pf, the primary winding 113 has a value of 7 $\mu$H, the secondary winding has a value of 7.7 $\mu$H, and the boost inductor 102 has a value of 320 $\mu$H. The inductance value of the windings was chosen to allow switching of the circuit as fast as possible while optimizing efficiency, but not switching so fast as to result in snap-off for boost diode 106.

Preferably, the resonant diodes are all the same diode type. Thus the present invention has the advantage that the topology does not depend upon the precise selection of resonant diode speed characteristics, as was the case for the topology of FIG. 4. The present invention also does not depend upon certain diode speed characteristics being consistent over the operating temperature ranges. The sequence of operation of the resonant network 120 and clamping circuit, in the context of a boost converter and the advantages resulting therefrom, will now be described with respect to FIGS. 5–9.

The first stage of operation starts at the end of the conduction of the boost diode 106. The boost inductor 102 is large enough to keep the input current constant. During this stage the snubber capacitor 110 and snubber inductive element 132 are discharged.

After a predetermined amount of time has elapsed, the second stage is entered. The second stage is initiated by auxiliary switch 108 being turned on. As the drain of auxiliary switch 108 decreases, the voltage increases across inductive element 132. Even if the voltage at the anode of the fourth resonant diode 130 goes down below zero there is no over shoot because the voltage of the cathode decreases at the same time, the turns ratio being near unity.

At turn on of the auxiliary switch 108, the saturable bead of the inductive element 132 provides a large inductance, preferably about 100 $\mu$H to 400 $\mu$H, that keeps the current very low, due to the bead's high permeability at low current, in order to achieve the ZCS commutation on the auxiliary switch 108. Once the drain voltage of auxiliary switch 108 reaches zero, 400 volts is applied across inductive element 132. At this stage, the bead is not saturated and its large inductance results in a di/dt of about 400V/100 $\mu$H (4 A/usec) to 400V/400 $\mu$H (1 A/usec).

A short time after that drain voltage reaches zero, the saturable bead saturates to present a small inductance, preferably about 7 $\mu$H. In the preferred embodiment, the inductance of the secondary winding 114 is preferably ten percent more, or 7.7 $\mu$H. Once the saturable bead saturates, the current increases faster with a di/dt of 400V/7 $\mu$H (57 A/usec). When the current in the primary winding 113 of inductive element 132 reaches the input current, the boost diode 106 turns off with a controlled di/dt of 57 A/usec. A resonance then starts between primary winding 113 and the Coss of the control switch 104. The 1/2 Coss*(400V)$^2$ is transferred to 1/2*(inductance of inductive element 132)*I$^2$. This current spike is added to the current that already circulates in primary winding 113. The drain of control switch 104 will decrease to zero during this resonance.

In the preferred embodiment of the present invention, the inductance of the primary winding 113 is about 7 $\mu$H when the bead is saturated and from 100 to 400 $\mu$H when it is not saturated. The inductance of the secondary winding 114 is about 7.7 $\mu$H when the bead is saturated and from 110 to 440 $\mu$H when it is not saturated. For an alternative embodiment where the saturable bead is not present, the inductance of the primary winding 113 is about 7 $\mu$H and the inductance of the secondary winding 114 is ten percent higher or about 7.7 $\mu$H.

A gate resistor 125, preferably 5.6 ohms, is coupled in series between the first signal generator 118 and the gate of control switch 104. A gate resistor 127 that is coupled in series between a second signal generator 123 and the gate of the auxiliary switch 108, is a higher value, preferably 20 ohms, in order to reduce the dv/dt at turn on, a source of EMI.

During a third stage, a ZVS detection circuit 118 (details not shown) monitors the voltage across the control switch 104 and turns it on at zero volts. The snubber resonant capacitor 110 stays discharged to zero, its value being very large compared to the parasitic capacitance of the second resonant diode 116 and a third resonant diode 117.

After a predetermined amount of time has elapsed, the fourth stage is entered. The fourth stage is initiated by auxiliary switch 108 being turned off. At the time the auxiliary switch 108 is turned off, the energy in inductive element 132 charges the Coss of the auxiliary switch 108 and resonant capacitor 110, which reduces the dv/dt up to the output voltage. The voltage across secondary winding 114 will be clamped to the output voltage, thus because of the turns ratio of 5% for the preferred embodiment, the voltage across the primary winding 113 will be 5% less (380 volts). During this stage, resonant capacitor 110 is charged to the output voltage to reduce the dv/dt across the control switch 104 when it will turn off.

As the voltage across the auxiliary switch 108 increases, the voltage across the primary to secondary leakage inductor increases up to five percent of the output voltage (20 volts). The magnetizing current of inductive element 132 starts to transfer from primary to secondary with the transfer rate reaching 20 volts/leakage-inductor A/usec. At the end of this transfer, the fourth resonant diode 130 is turned on and the first resonant diode 115 is turned off with its parasitic capacitor charged to 20 volts. This low voltage does not generate any oscillations. The current in the secondary winding 114 will circulate through the resonant diodes 130, 116, and 117. For a preferred value of 7.7 $\mu$H for the secondary winding 114, this circulating current will decreases at a rate of 400V/7.7 $\mu$H (52 A/usec). Once the current reaches zero, it changes direction to turn the three resonant diodes 130, 116, and 117 off to the non-conducting state. The bead of inductive element 132 also limits the overshoot across the fourth resonant diode 130. After the three diodes are recovered, due to the transformer effect, the parasitic capacitors of both the first resonant diode 130 and fourth resonant diode 115 will be charged by the Coss of the auxiliary switch 108. The Coss of the auxiliary switch 108 needs to be charged lower than 400 volts in order to accept the small amount of charges provided by the discharge of the parasitic capacitor of diode 115 at the control switch 104 turn off without turning the second resonant diode 116 and third resonant diode 117 on.

The clamping circuit, formed by the series combination of the first clamping diode 126 and the second diode 128, will limit the overshoot across the fourth resonant diode 130. The overshoot arrives on the fourth resonant diode 130. A first clamping diode 126 and a second clamping diode 128 are connected to node 129 to clamp the first resonant diode 115. Thus, the transformer effect will allow 5% more over voltage. For the preferred embodiment the clamping circuit triggers at forty volts, thus the overshoot on the fourth resonant diode 130 will be five percent more, 42 volts, above the output voltage. At this stage, the commutation is completed and the boost converter of the present invention is in the energy acquisition mode. The converter will remain in this mode as long as the pulse width is present.

After a predetermined amount of time has elapsed, the fifth stage is entered. The fifth stage is initiated by the control switch 104 being turned off. During this stage, resonant capacitor 110 is charged to 400 volts and the current deviates from the control switch 104 to resonant capacitor 110 in order to limit the dv/dt. (This particular functionality of the resonant capacitor 110 is as described for snubber resonant capacitor 42 for the topology for FIG. 3 above.) As the voltage at the drain terminal of the control switch 104 increases, the voltage across inductive element 132 increases. Looking at the way inductive element 132 is connected in FIG. 5, at this stage with control switch 104 being turned off, the primary winding 113 and secondary winding 114 are in series with opposite polarity. The first resonant diode 115 is in the direction of the dv/dt and the fourth resonant diode 130 in the opposite direction. Thus, at this stage with control switch 104 being turned off (and auxiliary switch 108 previously turned off in the fourth stage) the path of the current flow is out of primary winding 113 (out of the dot), forward in the first resonant diode 115, reverse through the fourth resonant diode 130, and into the secondary winding 114 (into the dot). This current flow brings about the transformer mode where the inductive element 132 behaves as a transformer. During this transformer mode, the first resonant diode 115 and the fourth resonant diode 130 discharge from the opposite direction.

Because the voltage across the primary winding 113 subtracts with the one across the secondary winding 114, the dv of the control switch 104 will be split between the first resonant diode 115 and the fourth resonant diode 130. For equal parasitic capacitances, the first resonant diode 115 would discharge to half of the output voltage and the fourth resonant diode 130 would charge up to fifty percent more than the output voltage with only the leakage inductor from primary to secondary of inductive element 132 in series. To limit the reverse voltage across the fourth resonant diode 130, capacitor 124 has been added that is a value about twice that of the parasitic capacitor of the fourth resonant diode 130, which is about 25 pF. In the preferred embodiment, capacitor 124 is about 47 pF. Therefore the voltage across the fourth resonant diode 130 is reduced to 500V at the time the voltage at the drain terminal of the control switch 104 has reached 400V. The charge of the first resonant diode 115 will charge from 0 to 300V resulting in 100V across it.

Figure 6:
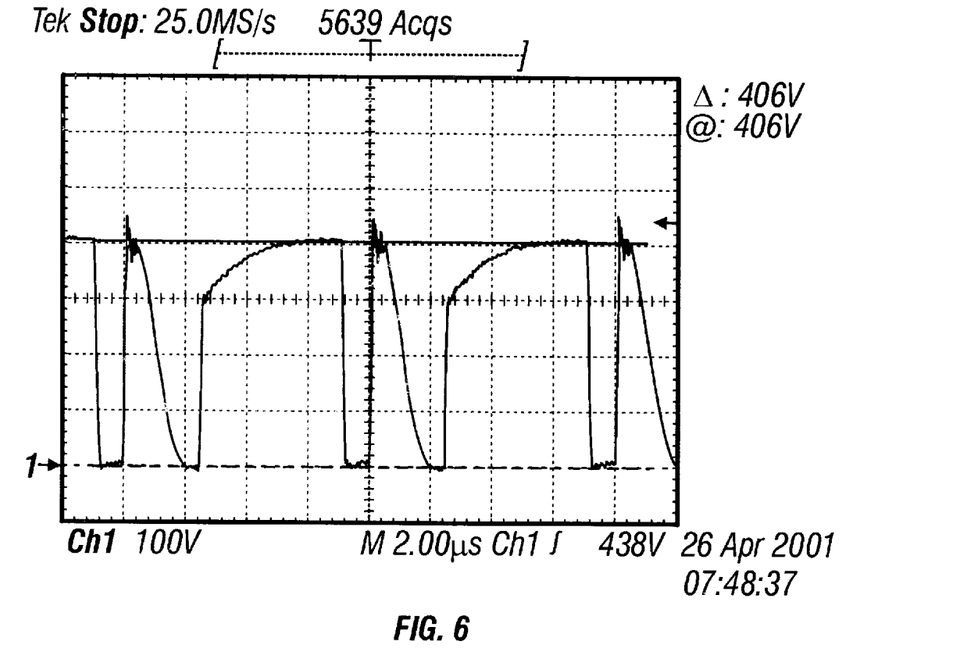
FIG. 6 is a graph illustrating the voltage characteristics versus time of the anode of the first resonant diode in the boost converter of FIG. 5.
Figure 7:
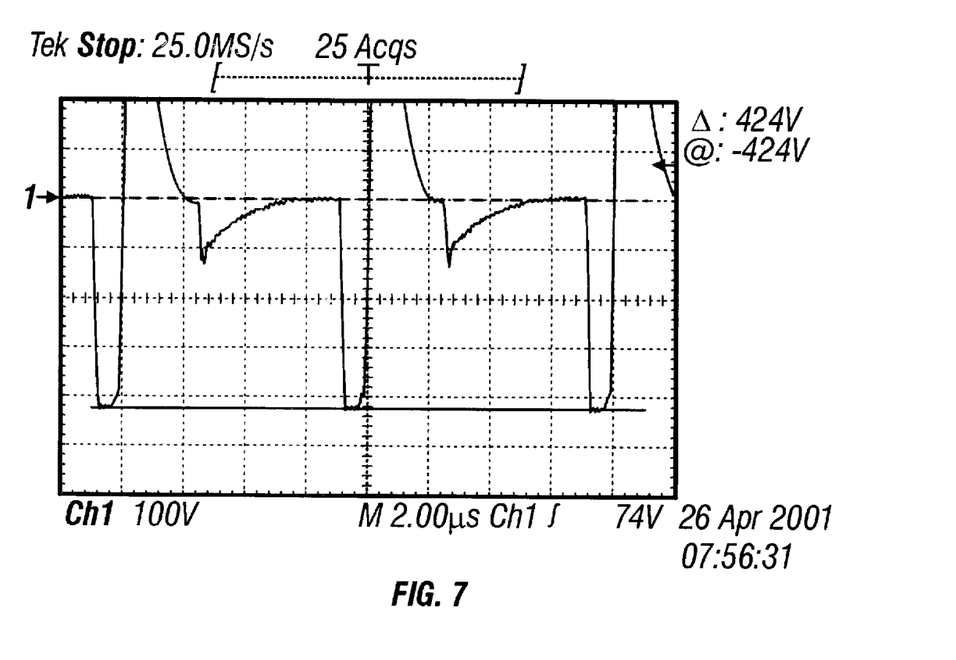
FIG. 7 is a graph illustrating the voltage characteristics versus time of the anode of the fourth resonant diode in the boost converter of FIG. 5.

FIG. 6 is a graph illustrating the voltage characteristics versus time of the anode of the first resonant diode 115 in the boost converter of FIG. 5. The waveform shows the voltages from the anode of the first resonant diode 115 to ground. FIG. 6 illustrates how fast the anode of the first resonant diode 115 reaches 300 volts. FIG. 7 is a graph illustrating the voltage characteristics versus time of the anode of the fourth resonant diode 130 in the boost converter of FIG. 5. The waveform shows the voltages from the anode of the fourth resonant diode 115 to ground. As the dv/dt is limited by resonant capacitor 110 as described above, the effect of the leakage inductor is negligible. FIG. 7 shows how fast the anode of the fourth resonant diode 130 reaches −100 volts (the cathode of the fourth resonant diode 130 being at 400 volts, it has 500 volts across). During the increase of the voltage at the drain of the control switch 104, the magnetizing inductor does not appear, thus the dv/dt of the anode of each of the diodes 115 and 130 follows the dv/dt of the control switch 104, which is controlled by the resonant capacitor 110.

The sixth stage in the sequence is the discharge of the parasitic capacitor of the first resonant diode 115 to zero volts and the parasitic capacitance of the fourth resonant diode 130 to 400 volts. During this stage, the current in parasitic capacitors of first resonant diode 115 and the fourth resonant diode 130 are in the same direction (forward), thus, inductive element 132 acts as an inductor rather than as a transformer, with the magnetizing inductance coming back in the circuit. Since the current splits according to the capacitance value, with the added capacitor 124, with a value that is preferably twice that of the parasitic capacitor of the fourth resonant diode 130; the discharge of 75% of the voltage does not have to be stored in the magnetizing inductor and transferred to the second resonant diode 116 and the third resonant diode 117. Without the secondary winding 114 of the present invention, all the energy needed to discharge the parasitic capacitor of the first resonant diode 115 down to zero has to be stored in the magnetizing inductor. Compared to the circuit without the secondary winding 114, the present invention discharges a capacitor four times the value but charged at four times less the voltage; thus, since the energy transfer depends on the capacitance and the square of the voltage, the energy transfer to inductive element 132 is four times less. This shows the effect of the addition of the secondary winding 114.

Figure 8:
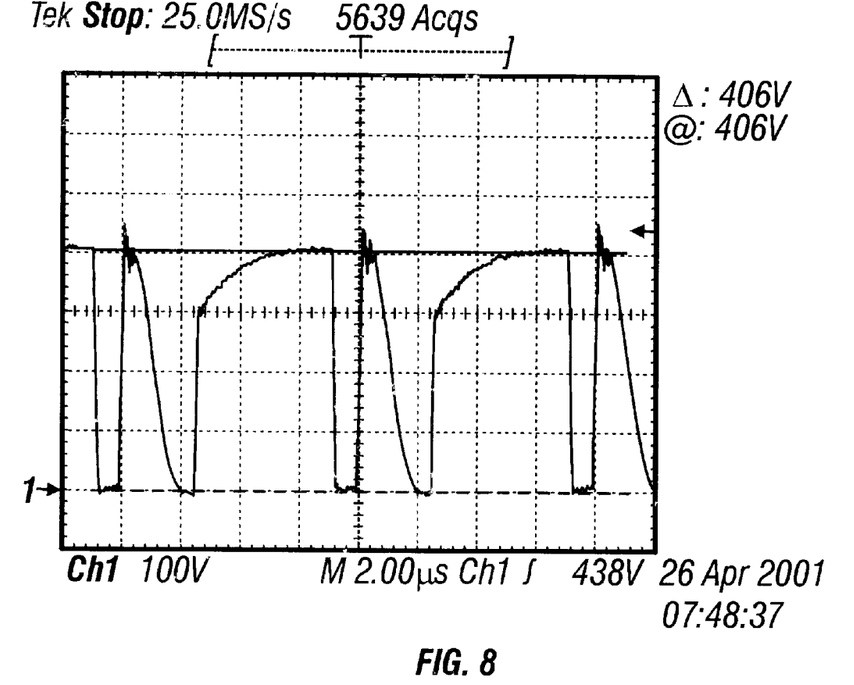
FIG. 8 is a graph illustrating the voltage characteristics versus time of the anode of the first resonant diode in the boost converter of FIG. 5.

FIG. 8 is a graph illustrating the voltage characteristics versus time of the anode of the first resonant diode (to ground) in the boost converter of FIG. 5. By contrast, FIG. 9 is a graph illustrating the voltage characteristics versus time of the same voltage, the anode of the first resonant diode to ground, in the boost converter topology of FIG. 4.

The secondary winding 114 only allows a very small current in the primary winding 113, as the dv/dt at that time shows in FIG. 8. This current is not even enough to recharge the Coss of the auxiliary switch 108 (and capacitor 110) to 400 volts to turn on the second resonant diode 116 and the third resonant diode 117 before the turn on of auxiliary switch 108. As a result, auxiliary switch 108 will be turned on without the recovery current of the second resonant diode 116 and the third resonant diode 117, thus reducing EMI.

Figure 9:
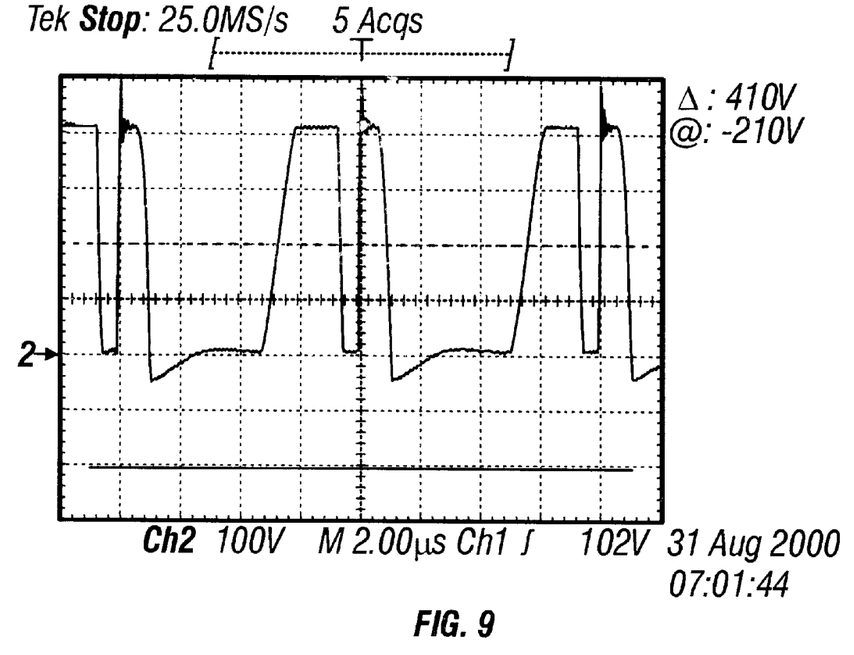
FIG. 9 is a graph illustrating the voltage characteristics versus time of the anode of the first resonant diode in the boost converter of FIG. 4.

Referring to FIGS. 8 and 9, the dv/dt at the anode of the first resonant diode 115 after the control switch 104 is off and has reached 400V clearly shows that there is an important current in the first resonant diode 115 without secondary winding 114 (at 4 division in FIG. 9) compared to the current with the secondary winding 114 of the present invention (at 4.5 division in FIG. 8). FIGS. 8 and 9 show a difference of at least 20 times the current (extrapolated from the dv/dt). Under the same conditions, the first resonant diode 115 is conducting and clamped to 400V by the resonant diodes 36, 44 (in FIG. 4) without the secondary winding 114 when the auxiliary switch is turned on (division 4.7 in FIG. 9). That will generate EMI. By contrast, that is not the case for the present invention in FIG. 5 with the secondary winding 114 (division 4.5 in FIG. 8).

Figure 10:
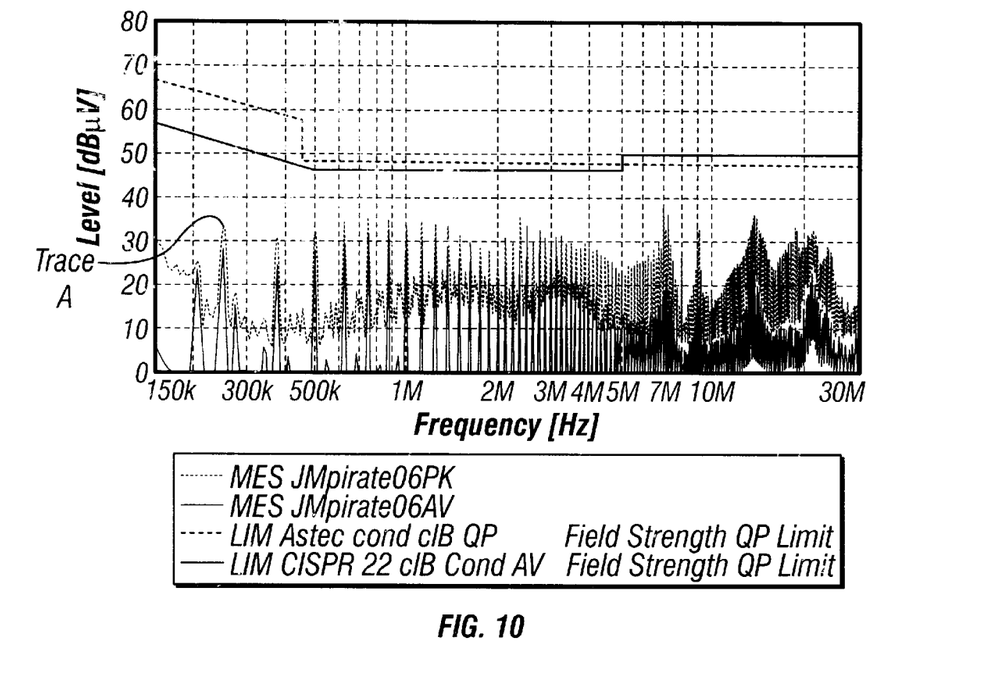
FIG. 10 is a graph showing measured EMI results for the topology of FIG. 5, which includes the auxiliary winding.
Figure 11:
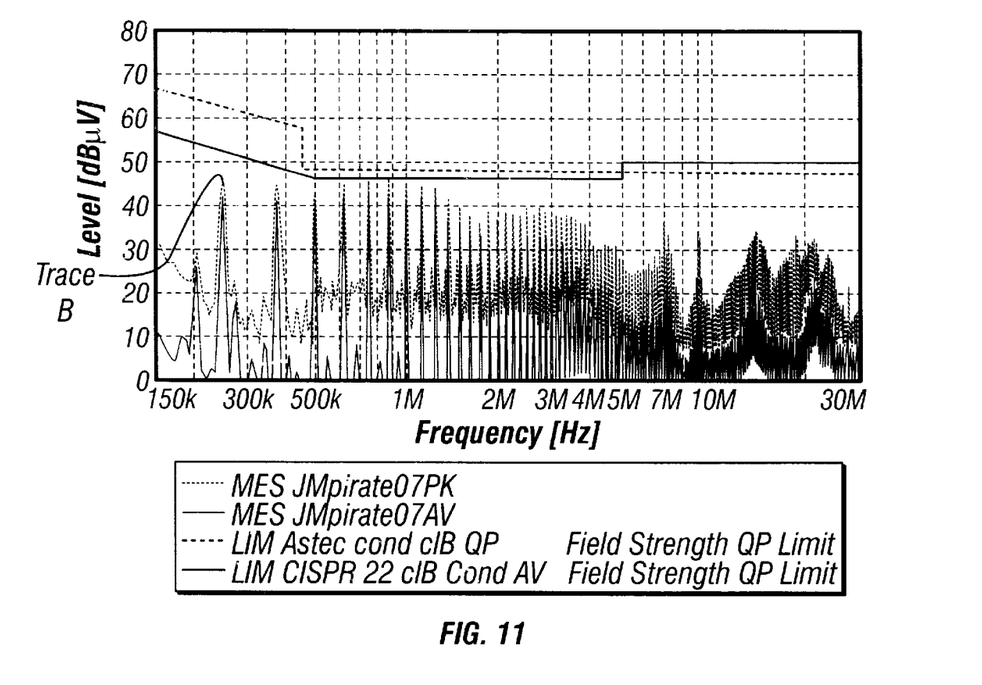
FIG. 11 is a graph showing measured EMI results for the topology of FIG. 4, which does not include an auxiliary winding.

The impact of the secondary winding 114 of the present invention on EMI is illustrated in FIGS. 10 and 11. FIG. 10 is a graph showing measured EMI results for the topology of FIG. 5, which includes the secondary winding. Trace A shows the level of EMI for one of the measurements in FIG. 10. FIG. 11 is a graph showing measured EMI results for the topology of FIG. 4, which does not include a secondary winding. The results shown in FIGS. 10 and 11 have been measured at the same diode. In FIG. 11, Trace B shows the comparable EMI level corresponding to the measurement in Trace A in FIG. 11. Comparing Traces A and B, the results show about a 10 db reduction in EMI for the present invention topology of FIG. 5, as compared to the topology of FIG. 4 which does not include the secondary winding.

In summary, the present invention has the advantage of reducing the energy stored in the parasitic capacitor of the first resonant diode 115 by a factor of 4 at the turn off of the control switch. This reduction is achieved by allowing only a small amount of energy transfer to the inductive element 132 so that it does not turn the second resonant diode 116 and third resonant diode 117 on before the auxiliary switch 108 is turned on, thus reducing losses and EMI.

The foregoing detailed description of the invention has been provided for the purposes of illustration and description. Although an exemplary embodiment of the present invention has been described in detail herein with reference to the accompanying drawings, it is to be understood that the invention is not limited to the precise embodiment disclosed, and that various changes and modifications to the invention are possible in light of the above teaching. Accordingly, the scope of the present invention is to be defined by the claims appended hereto.

What is claimed is:

1. A power converter having two input terminals for connection to a power source, comprising:
    an inductor connected to a first one of said input terminals;
    a boost diode connected in series communication with said inductor, said boost diode having a cathode connected to a first output terminal;
    an output capacitor coupled across said first output terminal and a second output terminal;
    a control switch, connected between a first node at the junction of said series connected inductor and boost diode and a second of said input terminals, for controlling the application of voltage to said output terminals as a function of the duty cycle of said control switch, the second of said input terminals and said second output terminal being connected in common;
    a resonant network, coupled between said first node and said first output terminal, said resonant network including a snubber inductive element, a first resonant diode, a second resonant diode, a third resonant diode, and a fourth resonant diode, said snubber inductive element having a primary winding and secondary winding, said primary winding and said first resonant diode connected in series between said first node and a second node, the cathode of said first resonant diode coupled to said second node and the anode of said first resonant diode coupled to said primary winding, said second and third resonant diodes connected in series between said second node and said first output terminal, said secondary winding and said fourth resonant diode connected in series between said second input terminal and said second node, the anode of said fourth resonant diode coupled to said secondary winding and the cathode of said fourth resonant diode coupled to said second node;
    a first resonant capacitor coupled between said first node and the junction of said second and third resonant diodes; and
    an auxiliary switch, connected between said second node and said second output terminal, said auxiliary switch being turned on such that the voltage at said control switch is caused to reduce to zero when said control switch turns on.

2. The converter of claim 1, wherein the resonant network comprises a second resonant capacitor connected in parallel with said fourth resonant diode.

3. The converter of claim 2, wherein said fourth resonant diode has a parasitic capacitance and the capacitance of said second resonant capacitor is about twice the value of said parasitic capacitance of said fourth resonant diode.

4. The converter of claim 1, comprising a series combination of a first clamping diode and a second clamping diode connected between the junction of said first resonant diode and said primary winding and said second output terminal, wherein said series combination limits the overshoot voltage across said fourth resonant diode.

5. The converter of claim 1, wherein said snubber inductive element comprises two cores, said primary and secondary windings being wound on said two cores.

6. The converter of claim 5, wherein one of said two cores is a toroid inductor that behaves as a low inductance with high saturation.

7. The converter of claim 6, wherein one of said two cores is a saturable bead core that behaves as a high inductance element with low saturation, wherein said saturable bead core causes the current at said auxiliary switch to be reduced to zero when said auxiliary switch turns on.

8. The converter of claim 1, wherein the polarity of said primary winding and the polarity said secondary winding are such that said snubber inductive element is caused to operate as a transformer during turn off of said control switch, wherein current is caused to flow in the forward direction in said first resonant diode and in the reverse direction in said fourth resonant diode.

9. The converter of claim 8, wherein once the turn off of said control switch is complete, said inductive element is caused to operate as an inductor, wherein the current is caused to flow in the forward direction in said first resonant diode and in the forward direction in said fourth resonant diode.

10. The converter of claim 1, wherein the anode of said second resonant diode is coupled to said second node, the cathode of said second resonant diode is coupled to the anode of said third resonant diode, and the cathode of said third resonant diode is coupled to said first output terminal.

11. The converter of claim 1, wherein the said auxiliary switch is a metal oxide semiconductor field effect transistor having a source, drain and gate, the drain of said auxiliary switch being coupled to said first node.

12. The converter of claim 1, wherein said control switch is a metal oxide semiconductor field effect transistor having a source, drain and gate.

13. The converter of claim 12, wherein the duty cycle of said control switch is controlled by a feedback control means for enabling the voltage applied to said output terminals to be regulated at a predetermined level, said feedback control means including means for generating a pulse width modulated signal of constant frequency, said signal coupled to the gate of said control switch.

14. The converter of claim 4, wherein the cathode of said first clamping diode connects to the junction of said first resonant diode and said primary winding, the anode of said first clamping diode is coupled to the anode of said second clamping diode, and the cathode of said second clamping diode connects to said second output terminal.

15. The converter of claim 14, wherein said second clamping diode is a zener diode.

16. The converter of claim 5, wherein the turns ratio is five percent such that there are five percent more turns at said secondary winding than at said primary winding.

* * * * *